(12) United States Patent
Augustsson (10) Patent No.: US 6,574,391 B2
(45) Date of Patent: Jun. 3, 2003

(54) APPARATUS AND METHOD FOR WAVELENGTH SELECTIVE SWITCHING

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 66 days.

(21) Appl. No.: 09/846,305

(22) Filed: May 2, 2001

(65) Prior Publication Data

US 2001/0038735 A1 Nov. 8, 2001

(30) Foreign Application Priority Data

May 3, 2000 (SE) .............................................. 0001619

(51) Int. Cl.$^7$ ................................................. G02B 6/28
(52) U.S. Cl. .................................. 385/24; 385/3; 385/31
(58) Field of Search .............................. 385/1–10, 14, 385/16–18, 24, 31, 37, 39–48

(56) References Cited

U.S. PATENT DOCUMENTS

| 5,915,051 | A | | 6/1999 | Damask et al. | |
|---|---|---|---|---|---|
| 5,933,554 | A | | 8/1999 | Leuthold et al. | |
| 6,212,315 | B1 | * | 4/2001 | Doerr | 385/31 |
| 6,337,755 | B1 | * | 1/2002 | Cao | 359/124 |
| 6,351,581 | B1 | * | 2/2002 | Doerr et al. | 385/24 |

FOREIGN PATENT DOCUMENTS

| EP | 0933963A2 A | 8/1999 |
|---|---|---|
| WO | WO00/18042 A | 3/2000 |

OTHER PUBLICATIONS

Torsten Augustsson: "Theoretical Investigation of a Wavelength Selective Switch Architecture Based on a Bragg–Grating–Assisted MMIMI Configuration". IEEE Photonics Technology Letters, vol. 11, No. 7, Jul. 1999.

Torsten Augustsson: "Bragg grating assisted MMIMI coupler for wavelength selective switching". Electronic Letters; Dec. 10, 1998, vol. 34, No. 25.

* cited by examiner

*Primary Examiner*—Akm E. Ullah
*Assistant Examiner*—Michelle R. Connelly-Cushwa
(74) *Attorney, Agent, or Firm*—Burns, Doane, Swecker & Mathis, L.L.P.

(57) ABSTRACT

The present invention relates to an apparatus and a method for wavelength selective switching of a plurality of optical wavelength channels. The apparatus comprises two MMI waveguides interconnected by at least two Mach-Zehnder waveguide structures arranged in parallel, of which each is arranged to transmit a respective portion of the intensity of said plurality of optical wavelength channels. Each Mach-Zehnder waveguide structure comprises a demultiplexing unit, a multiplexing unit and at least two waveguides arranged in parallel, wherein the demultiplexing unit is arranged for demultiplexing of said plurality of optical wavelength channels into at least two channel groups, each waveguide arranged in parallel is arranged for transmission of a respective of said channel groups to the multiplexing unit, and is further provided with a respective multichannel wavelength selective phase control unit arranged for individual phase control of at least some channels in the respective of said channel groups, which is transmitted to the multiplexing unit, and the multiplexing unit is arranged for multiplexing of said channel groups.

20 Claims, 6 Drawing Sheets

APPARATUS AND METHOD FOR WAVELENGTH SELECTIVE SWITCHING

This application claims priority under 35 U.S.C. §119 and/or 365 to 0001619-6 filed in Sweden on May 3, 2000; the entire content of which is hereby incorporated by reference.

TECHNICAL FIELD

The present invention relates to optical transmission techniques, particularly single mode integrated optics, for tele and data communication. Specifically, the invention relates to an apparatus and a method for wavelength selective switching of optical wavelength channels.

DESCRIPTION OF RELATED ART AND BACKGROUND OF THE INVENTION

In order to increase the capacity of an optical transmission line (point to point connection) or in an optical network (multipoint to multipoint connection) there are today a number of known techniques. One of these comprises to utilize wavelength division multiplexing (WDM) of transmission channels to enhance the utilization of bandwidth in the network, which, however, requires access to apparatuses capable of switching, multiplexing and demultiplexing transmission channels, which are transmitted on different so-called optical carrier wavelengths in the network. In order to reconfigure an optical network wavelength selectively, tunable wavelength selective switches are required.

Through the publication *Theoretical Investigation of a Wavelength Selective Switch Architecture Based on a Bragg Grating-Assisted MMIMI Configuration*, IEEE Photonics Techn. Lett., Vol. 11, No. 7, July 1999, pages 839–841, is known an architecture for multichannel wavelength selective switching based on an MMI-based Michelson interferometer structure coupled in parallel provided with Bragg gratings (MMI, Multi Mode Interference).

The switching structure comprises a number of Michelson arms connected to an MMI structure, where each Michelson arm comprises an MMIMZI structure (MMIMZI, Multi Mode Interference Mach-Zehnder Interferometer) and a plurality of phase control units operating in reflection mode and connected in parallel to said MMIMZI structure. Each phase control unit comprises a plurality of serially coupled phase control elements and Bragg gratings and is arranged for phase control of a respective sub-group of the total number of channels, which are handled by the structure.

A drawback of the above-mentioned Michelson-based wavelength selective switch architecture is that problems with channel crosstalk may occur, e.g. due to process-dependent variation effects, despite the fact that the theory indicates low crosstalk. Further, the switch is assumed to be particularly sensitive for scattering losses, since it is based on reflection in long Michelson arms.

If many channels shall be handled, apparatuses, which are relatively complicated and relatively difficult and costly to realize, are required.

SUMMARY OF THE INVENTION

It is an object of the present invention to provide an apparatus and a method for completely individual wavelength selective switching of an optical wavelength multiplexed signal comprising a plurality of optical wavelength channels, which exhibit enhanced performance.

It is a further object of the invention to provide such an apparatus and such a method for wavelength selective switching, which can exhibit low channel crosstalk.

It is a further object of the invention to provide an apparatus and a method for completely individual wavelength selective switching, which may constitute an alternative to known techniques.

It is a particular object of the invention to provide an apparatus and a method for completely individual wavelength selective switching of many channels, wherein some channels can be individually switchable and other channels can belong to channel groups, the channels in each channel group being switched together.

It is a further object of the invention to provide an apparatus and a method for wavelength selective switching, wherein the ratio of the dimension of the switching (the sum of the number of inputs and outputs) and the maximum dimension required of the MMI couplers utilized during switching are large.

It is a further object of the invention to provide an apparatus and a method for wavelength selective switching, which, during use, will exhibit low power losses and are insensitive to instabilities.

Further objects of the present invention will be apparent from the detailed description below.

The above-mentioned objects are according to a first aspect of the present invention attained by an apparatus for wavelength selective switching of a plurality of optical wavelength channels, which comprises two MMI waveguides interconnected by at least two Mach-Zehnder waveguide structures arranged in parallel, of which each is arranged to transmit a respective portion of the intensity of said plurality of optical wavelength channels. According to the invention each Mach-Zehnder waveguide structure comprises a demultiplexing unit, a multiplexing unit and at least two waveguides arranged in parallel, wherein different channels are handled in parallel in different ones of the waveguides arranged in parallel.

The demultiplexing unit is more specifically arranged for demultiplexing of said plurality of optical wavelength channels into at least two channel groups, each waveguide is arranged in parallel for transmission of a respective of said channel groups to the multiplexing unit and is further provided with a respective multichannel wavelength selective phase control unit arranged for individual phase control of at least some channels in the respective of said channel groups, which is transmitted to the multiplexing unit, and the multiplexing unit is arranged for multiplexing of said channel groups.

According to a first embodiment, the demultiplexing unit and the multiplexing unit are each comprised of an MMIMZI-based device, where each MZI arm comprises a phase control element. These MMIMZI-based devices are preferably connected by the two waveguides arranged in parallel.

Preferably, each multichannel wavelength selective phase control unit is comprised of an MMIMZI-based device (MI, Michelson), where each MI arm at least comprises, as seen from the MMI waveguide, a first phase control element, a first Bragg grating, a second phase control element and a second Bragg grating, wherein the first Bragg grating is arranged for reflection of at least a first channel in the respective channel group, which is handled by the phase control unit, the second Bragg grating is arranged for reflection of at least a second channel in the respective channel group, which is handled by the phase control unit, and the phase control elements are arranged for phase control of the respective channels, which are transmitted through them.

In a second embodiment, the demultiplexing unit and the multiplexing unit are together comprised of an MMIMI-based configuration, where each MI arm comprises a respective MZI based demultiplexing/multiplexing unit and is arranged to transmit a respective portion of the intensity of said plurality of optical wavelength channels. In this respect, two waveguides are arranged in parallel at each demultiplexing/multiplexing unit, where each waveguide is provided with a respective multichannel wavelength selective phase control unit arranged for individual phase control of at least some channels in the respective channel group, which is transmitted in the waveguide.

Preferably, each of the multichannel wavelength selective phase control units comprises, as seen from the demultiplexing/multiplexing unit, a first phase control element, a first Bragg grating, a second phase control unit and a second Bragg grating, wherein the first Bragg grating is arranged for reflection of at least a first channel in the respective channel group, which is handled by the phase control unit, the second Bragg grating is arranged for reflection of at least a second channel in the respective channel group, which is handled by the phase control unit, and the phase control elements are arranged for phase control of the respective channels, which are transmitted through them.

This embodiment is further characterized therein that each MI arm in the MMIMI-based configuration comprises a Bragg grating localized between the MMI waveguides of the MMIMI-based configuration and said MZI-based demultiplexing/multiplexing unit, the Bragg grating being arranged for reflection of at least some of said plurality of optical wavelength channels, and therein that at least some MI arm in the MMIMI-based configuration comprises a phase control element localized between the MMI waveguides of the MMIMI-based configuration and said Bragg grating, which is arranged for reflection of said at least some of said plurality of optical wavelength channels.

The apparatus according to the invention may be realized as an N×M switch and in the detailed description below particularly 1×2, 4×4 and 2×2 switches will be described.

The above-mentioned objects are according to a second aspect of the present invention attained by a method for wavelength selective switching of a plurality of optical wavelength channels, in an apparatus comprising two MMI waveguides, interconnected by at least two Mach-Zehnder waveguide structures arranged in parallel, of which each is arranged to transmit a respective portion of the intensity of said plurality of optical wavelength channels.

The method comprises that different channels are processed in parallel in each Mach-Zehnder waveguide structure.

More specifically, the steps of demultiplexing said plurality of optical wavelength channels into at least two channel groups by means of a demultiplexing unit, transmitting the respective channel group to a multiplexing unit by means of a respective waveguide connected in parallel between the demultiplexing unit and the multiplexing unit, are performed. At least some of the channels in the respective channel group, which is transmitted to the multiplexing unit, are individually phase-controlled by means of a respective multichannel wavelength selective phase control unit arranged at the respective waveguide arranged in parallel and said channel groups are multiplexed by means of the multiplexing unit.

An advantage of the present invention is that the switching capacity is considerably increased when different channels are processed in parallel.

SHORT DESCRIPTION OF THE DRAWINGS

The invention will be closer described below with reference to the appended drawings, which are only shown to illustrate the invention and shall in no way limit the same.

PREFERRED EMBODIMENTS

In the following description, for depicting and not limiting purposes, specific details are set forth, such as particular applications, techniques, methods, etc., in order to provide a thorough understanding of the present invention. It shall, however, be apparent for the man skilled in the art that the invention may be practiced in other embodiments that deviate from these specific details. In other instances, detailed descriptions of well-known methods, devices or circuits are omitted in order not to obscure the description of the present invention with unnecessary details.

The present invention comprises a new and inventive apparatus for wavelength selective switching of optical wavelength channels. The apparatus comprises two MMI couplers interconnected by at least two Mach-Zehnder structures arranged in parallel.

The wavelength selective apparatus may comprise i.a. the following basic components:

Waveguide-based Michelson interferometers and Mach-Zehnder interferometers are used in order to realize an interference component for e.g. filtering.

An MMI waveguide structure (MMI, Multi Mode Interference) is used for the splitting of light. The theory thereof may be found e.g. in L. B. Soldano and E. C. M. Pennings, *Optical Multi Mode Intefference Devices based on Self-Imaging*: Principles and Application, J. Lightwave Technol., Vol. 13(4), pages 615–627, 1995, and in references therein.

MMI splitting of light results in multiple imaging of the incoming intensity distribution. The length/width ratio of the MMI structures is decisive of the number of images at the outputs thereof, which images have a certain mutually determined phase relation, which depends on at which input the light is excited.

A Bragg grating is used for filtering and reflection of light. The filter profile may be modulated by the strength, length or variable period (grating wavelength), i.e. so-called chirp, of the grating. The strength and the period may be varied in the propagation direction of light. Such a variation of the strength is denoted apodization. In the present invention i.a. the type of Bragg grating, which reflects a broad spectral band (many wavelength channels), is used. This may be achieved by using a very strong grating or a chirped grating or a combination thereof.

A more thorough description of Bragg gratings for wavelength demultiplexing may be found e.g. in G. P. Agrawal and S. Radic, *Phase-shifted Fiber Gratings and their Application for Wavelength Demultiplexing*, IEEE Photon. Techn. Left., Vol. 6(8), pages 995–997, August 1994.

A phase adjustment element, which is normally used in order to provide switching capabilities, is in the present invention particularly useful for correction of imperfections during the manufacture of the inventive apparatus. It is basic for the phase adjustment element that the optical wavelength is affected by an externally applied signal (voltage, current, etc.). For this purpose, the best way to adjust the phase is probably to use a thermo optical element, i.e. affecting the refractive index (and thereby the optical path length) in the waveguides by means of the temperature. Some waveguides are also affected in a similar way by applying an electrical field over the waveguide, i.e. affecting the refractive index electro optically. If a permanent adjustment is sufficient, a UV trimming may be performed, at least for the material system $SiO_2/Si$.

Figure 1:
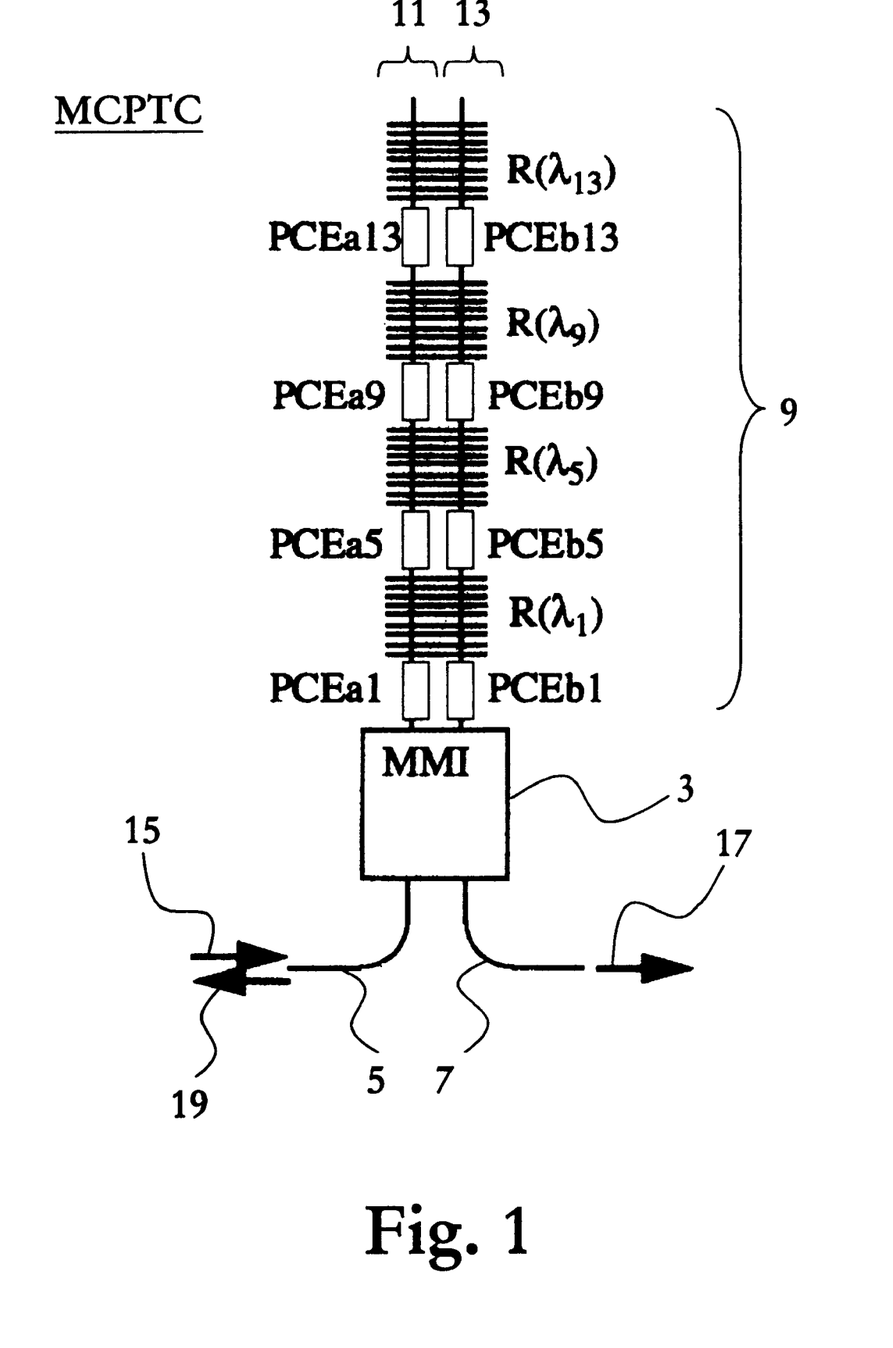
FIG. 1 illustrates schematically a multichannel wavelength selective phase control unit for use in a wavelength selective switch in accordance with the present invention.

With reference to FIG. 1, a multichannel wavelength selective phase control unit MCPTC (MCPTC, Multi Channel Phase Tuning Circuit) for use in a wavelength selective switch in accordance with the present invention comprises an MMI waveguide 3 of size 2×2, two access waveguides 5, 7 and an MI waveguide structure 9.

Access waveguides 5, 7 are connected to the MMI waveguide 3 via two ports located at a first side of the MMI waveguide and the MI waveguide structure 9, which comprises two MI arms 11, 13, is connected to the MMI waveguide 3 via two ports located at an opposite side of the MMI waveguide.

The two arms of the MI waveguide structure 9 comprise each a plurality of narrow band Bragg gratings of the reflection type denoted R and a plurality of phase control elements denoted PCE.

Thus, the arm 11 comprises in order, as seen from the MMI waveguide, a phase control element PCEa1, a Bragg grating $R(\lambda_1)$, a phase control element PCEa5, a Bragg grating $R(\lambda_5)$, a phase control element PCEa9, a Bragg grating $R(\lambda_9)$, a phase control element PCEa13 and a Bragg grating $R(\lambda_{13})$. Correspondingly, the arm 13 comprises a phase control element PCEb1, a Bragg grating $R(\lambda_1)$, a phase control element PCEb5, a Bragg grating $R(\lambda_5)$, a phase control element PCEb9, a Bragg grating $R(\lambda_9)$, a phase control element PCEb13 and a Bragg grating $R(\lambda_{13})$.

If an optical channel multiplex 15 comprising the channels $\lambda_1$, $\lambda_5$, $\lambda_9$ and $\lambda_{13}$ is input into the unit via access waveguide 5, the Bragg grating $R(\lambda_1)$ will reflect the channel $\lambda_1$, the Bragg gratings $R(\lambda_5)$ will reflect the channel $\lambda_5$, the Bragg gratings $R(\lambda_9)$ will reflect the channel $\lambda_9$ and finally the Bragg gratings $R(\lambda_{13})$ will reflect the channel $\lambda_{13}$.

Thus, the phase control elements PCEa1 and PCEb1 will control the phase of all channels in multiplex 15, while the phase control elements PCEa5 and PCEb5 will control the phase of the channels $\lambda_5$, $\lambda_9$, $\lambda_{13}$, the phase control elements PCEa9 and PCEb9 will control the phase of the channels $\lambda_9$ and $\lambda_{13}$ and finally the phase control elements PCEa12 and PCEb12 will only control the phase of the channel $\lambda_{13}$.

Through this arrangement it is thus possible to control the phase of the multiplex 15 on a channel-individual basis. Further, it is possible to control the phases in the respective arms 11, 13, such that channels are output in access waveguide 7 as output 17 or back into access waveguide 5 as output 19.

It shall be noted that the MI arms 11, 13 may be made arbitrarily long and be provided with an arbitrary number of Bragg gratings and phase control elements, such that the phase control unit MCPTC may control individually the phase of an arbitrary number of channels. For a further description of MMIMI-based phase control units reference is made to earlier Swedish patent applications No. 9700865-0, entitled *Optical device* and filed on Mar. 7, 1997, and No. 9902512-4, entitled *Wavelength selective device and switch and method thereby* and filed on Jul. 1, 1999, filed by Applicant. These applications are hereby incorporated by reference.

Figure 2:
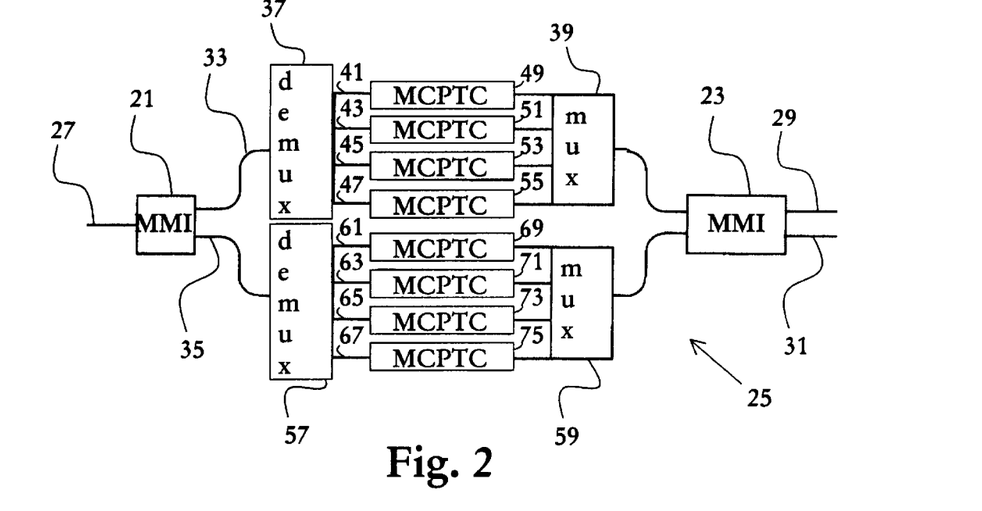
FIG. 2 illustrates schematically a switch according to a first embodiment of the present invention, wherein said switch comprises a plurality of the multichannel wavelength selective phase control unit of FIG. 1.

With reference next to FIG. 2, a 1×2 switch according to a first embodiment of the present invention will be depicted. The switch comprises two MMI waveguides 21, 23 interconnected by a Mach-Zehnder waveguide 25. The MMI waveguide 21 has an input port, to which an access waveguide 27 is connected for input of a wavelength multiplexed optical signal comprising 16 channels, $\lambda_1$, $\lambda_2$, . . . , $\lambda_{16}$. The MMI waveguide 23 has two output ports, to which a respective access waveguide 29, 31 is connected for output of two separated signals.

The Mach-Zehnder waveguide structure 25 comprises an upper arm 33 and a lower arm 35, which are arranged to transmit a respective portion of the intensity of the wavelength multiplexed optical signal.

The upper arm comprises a demultiplexing unit 37 and a multiplexing unit 39 interconnected by four waveguides 41, 43, 47, 49 arranged in parallel. The demultiplexing unit 37 and the multiplexing unit 39 are preferably MMIMZI-based devices, see e.g. the publication *A new type of tunable demultiplexer using a multi-leg Mach-Zehnder interferometer*, J. -P. Weber et al, Proc. ECIO '97 EthE5, Stockholm, pages 272–275, 1997. Each waveguide 41, 43, 47, 49 is provided with a respective 49, 51, 53, 55 of the multichannel wavelength selective phase control unit MCPTC shown in FIG. 1, where, however, the Bragg gratings are tuned to different channels.

The phase control unit 49 is thus arranged for phase tuning of the channels $\lambda_1$, $\lambda_5$, $\lambda_9$, $\lambda_{13}$, the phase control unit 51 is arranged for phase tuning of the channels $\lambda_2$, $\lambda_6$, $\lambda_{10}$, $\lambda_{14}$, the phase control unit 53 is arranged for phase tuning of the channels $\lambda_3$, $\lambda_7$, $\lambda_{11}$, $\lambda_{15}$ and the phase control unit 55 is arranged for phase tuning of the channels $\lambda_4$, $\lambda_8$, $\lambda_{12}$, $\lambda_{16}$.

In such a way parallel processing of different channels in different MZI arms is obtained.

Correspondingly, the lower arm comprises a demultiplexing unit 57 and a multiplexing unit 59 connected by four waveguides 61, 63, 65, 67 arranged in parallel. The demultiplexing unit 57 and the multiplexing unit 59 are also preferably MMIMZI-based devices. Each waveguide 61, 63, 65, 67 is provided with a respective 69, 71, 73, 75 of the multichannel wavelength selective phase control unit MCPTC of FIG. 1, where, however, the Bragg gratings are tuned to different channels.

The phase control unit 69 is thus arranged for phase tuning of the channels $\lambda_1, \lambda_5, \lambda_9, \lambda_{13}$, the phase control unit 71 is arranged for phase tuning of the channels $\lambda_2, \lambda_6, \lambda_{10}, \lambda_{14}$, the phase control unit 73 is arranged for phase tuning of the channels $\lambda_3, \lambda_7, \lambda_{11}, \lambda_{15}$ and the phase control unit 75 is arranged for phase tuning of the channels $\lambda_4, \lambda_8, \lambda_{12}, \lambda_{16}$.

It shall be appreciated by the man skilled in the art that the phase control units 49, 51, 53, 55 and 69, 71, 73, 75, respectively, may be arranged for phase tuning of other than the above-mentioned channels. The phase control units 49, 69 may e.g. be arranged for phase tuning of the channels $\lambda_1, \lambda_5, \lambda_9, \lambda_{13}$, the phase control units 51, 71 may be arranged for phase tuning of the channels $\lambda_2, \lambda_6, \lambda_{10}, \lambda_{14}$, the phase control units 53, 73 may be arranged for phase tuning of the channels $\lambda_4, \lambda_8, \lambda_{12}, \lambda_{16}$ and the phase control units 55, 75 may be arranged for phase tuning of the channels $\lambda_3, \lambda_7, \lambda_{11}, \lambda_{15}$.

By active control of the phase control elements in the 1×2 switch shown in FIG. 2 completely individual switching possibilities for the 16 channels in the incoming multiplex is thus obtained and each of the channels may be output in waveguides 29 or 31 or be switched back into waveguide 27. Each channel is controlled by means of four phase control elements, e.g. the channel $\lambda_1$ is e.g. controlled by means of the phase control elements PCEa1 and PCEb1 in unit 49 and by means of the phase control elements PCEa1 and PCEb1 in unit 69. Correspondingly, the channel $\lambda_{16}$ is controlled by means of the phase control elements PCEa16 and PCEb16 in unit 55 and by means of the phase control elements PCEa16 and PCEb16 in unit 75.

Figure 3:
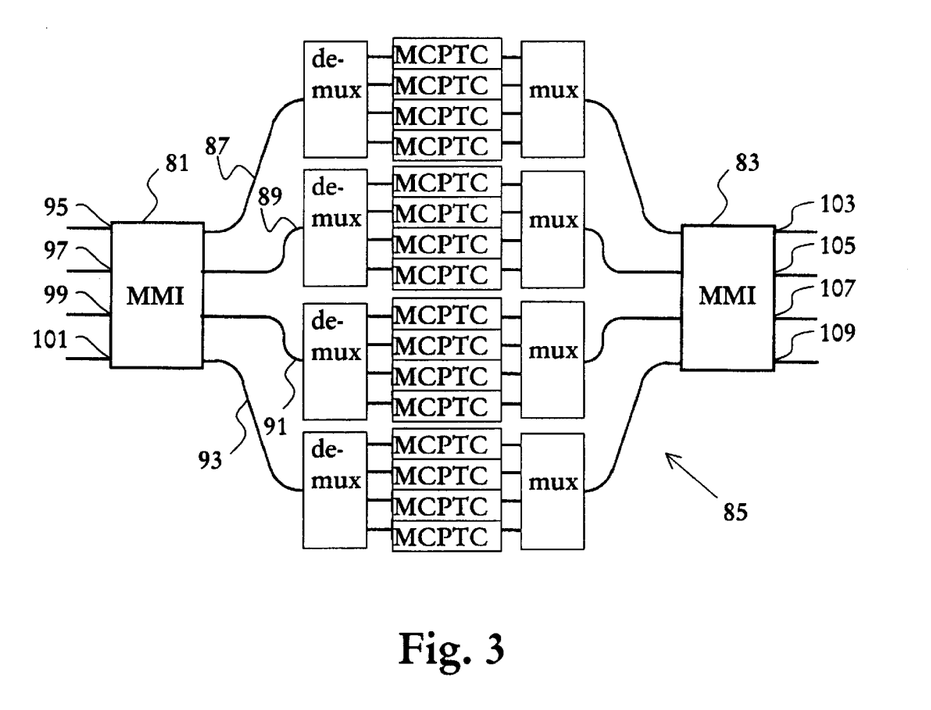
FIG. 3 illustrates schematically a switch according to a second embodiment of the present invention, wherein said switch comprises a plurality of the multichannel wavelength selective phase control unit of FIG. 1.

With reference next to FIG. 3, a 4×4 switch according to a first embodiment of the present invention will be described. The switch handles 16 channels and is similar to the switch shown in FIG. 2. The switch comprises two 4×4 MMI waveguides 81, 83 interconnected by a Mach-Zehnder waveguide structure 85 including four MZI arms 87, 89, 91, 93. The MMI waveguide 81 has four input ports 95, 97, 99 101 for inputting of the 16 channels, $\lambda_1, \lambda_2, \ldots, \lambda_{16}$. Further, the MMI waveguide 83 has four output ports 103, 105, 107, 109 for outputting of four separated signals.

Each arm 87, 89, 91, 93 comprises a structure such as the one included in arm 33 or arm 35 in FIG. 2, i.e. a demultiplexing unit, demux, and a multiplexing unit, mux, interconnected by means of four waveguides arranged in parallel. The demultiplexing unit and the multiplexing unit are preferably MMIMZI-based devices, see e.g. the above-mentioned publication by J. -P. Weber et al. Further, each waveguide is provided with a respective of the multichannel wavelength selective phase control unit MCPTC of FIG. 1, where, however, the Bragg gratings are tuned to different channels.

The uppermost phase control unit in each arm is thus arranged for phase tuning of the channels $\lambda_1, \lambda_5, \lambda_9, \lambda_{13}$, the second uppermost phase control unit in each arm is arranged for phase tuning of the channels $\lambda_2, \lambda_6, \lambda_{10}, \lambda_{14}$, the second lowest phase control unit in each arm is arranged for phase tuning of the channels $\lambda_3, \lambda_7, \lambda_{11}, \lambda_{15}$ and the lowest phase control unit in each arm 87, 89, 91, 93 is arranged for phase tuning of the channels $\lambda_4, \lambda_8, \lambda_{12}, \lambda_{16}$. The man skilled in the art shall realize that equivalent functionality may be obtained by other arrangements.

In such a way parallel processing of different channels in different MZI waveguides is obtained.

Through active control of the phase control elements in the 4×4 switch in FIG. 3 completely individual switching possibilities for the 16 incoming channels are thus obtained and each of the channels may be output at any output port 103, 105, 107, 109 (or input port 95, 97, 99, 101). Each channel is in this case controlled by means of eight phase control elements.

It shall be appreciated that the switch is entirely scalable both as regards the number of input paths and output paths as well as the number of manageable channels. Further, a channel or channel multiplex may be input at an arbitrary one of the inputs and outputs of the apparatus.

It shall also be appreciated that by using broader reflection bands of the Bragg gratings and/or closer channel distances several channels may be handled together, such as a channel group e.g. for switching in trunk lines.

Figure 4:
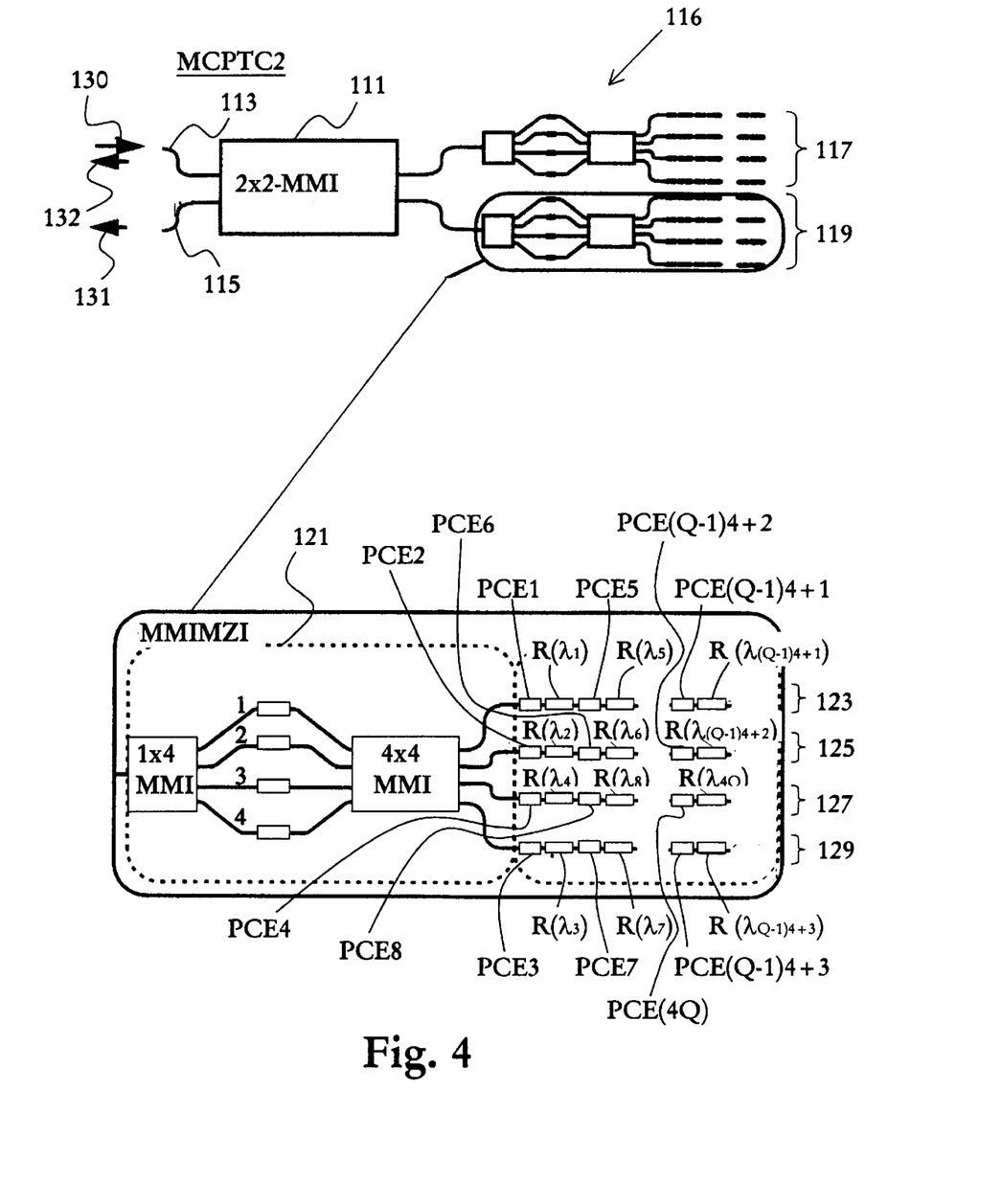
FIG. 4 illustrates schematically a multichannel wavelength selective phase control unit having completely individual phase control of the channels for use in a wavelength selective switch in accordance with the present invention, wherein one of the MI arms of the unit is shown enlarged in inset.

With reference now to FIG. 4, a multichannel wavelength selective phase control unit MCPTC2 (MCPTC, Multi Channel Phase Tuning Circuit) for use in a wavelength selective switch in accordance with the present invention comprises an MMI waveguide 111 of size 2×2, two access waveguides 113, 115 and an MI waveguide structure 116.

The access waveguides 113, 115 are connected to the MMI waveguide 111 via two ports located on a first side of the MMI waveguide and the MI waveguide structure 116, which comprises two MI arms 117, 119, is connected to the MMI waveguide 111 via two ports located on an opposite side of the MMI waveguide. The MI arms 117, 119 are each arranged to transmit a portion of the intensity of an optical wavelength multiplex.

The two arms of the MI waveguide structure 116 comprise each a demultiplexing/multiplexing unit 121, at which four waveguides 123, 125, 127, 129 are arranged in parallel. The (de)multiplexing unit 121 is preferably an MMIMZI-based device, see e.g. the publication *A new type of tunable demultiplexer using a multi-leg Mach-Zehnder interferometer*, J. -P. Weber et al, Proc. ECIO '97 EthE5, Stockholm, pages 272–275, 1997, and typically comprises a 1×4 MMI waveguide and a 4×4 MMI waveguide interconnected by means of four MZI arms indicated 1, 2, 3 and 4 in MMIMZI 121 each provided with a respective phase control element or phase adjustment element.

Each waveguide 123, 125, 127, 129 is provided with a plurality of phase control elements denoted PCE and a plurality of narrow band Bragg gratings of the reflection type denoted R. In the general case, where the phase control unit handles 4Q channels, where Q is a positive integer, each waveguide is provided with Q phase control elements and Q Bragg gratings.

Thus, the waveguide 123 comprises in order, as seen from the MMI waveguide, a phase control element PCE1, a Bragg grating $R(\lambda_1)$, a phase control element PCE5, a Bragg grating $R(\lambda_5)$, etc. up to a phase control element PCE(Q-1)4+1, and a Bragg grating $R(\lambda_{(Q-1)4+1})$. Further, the waveguide 125 comprises, as seen from the MMI waveguide, a phase control element PCE2, a Bragg grating $R(\lambda_2)$, a phase control element PCE6, a Bragg grating $R(\lambda_6)$, etc. up to a phase control element PCE(Q-1)4+2, and a Bragg grating R($\lambda_{(Q-1)4+2}$). The waveguide 127 comprises, as seen from the MMI waveguide, a phase control element PCE4, a Bragg grating R($\lambda_4$), a phase control element PCE8, a Bragg grating R($\lambda_8$), etc. up to a phase control element PCE(4Q), and a Bragg grating R($\lambda_{(Q)4}$). Finally, the waveguide 129 comprises, as seen from the MMI waveguide, a phase control element PCE3, a Bragg grating R($\lambda_3$), a phase control element PCE7, a Bragg grating R($\lambda_7$), etc. up to a phase control element PCE(Q–1)4+3, and a Bragg grating R($\lambda_{(Q-1)4+3}$).

In such a way a parallel processing of different channels in the different waveguides 123, 125, 127, 129 is obtained.

If an optical channel multiplex 130 comprising the channels $\lambda_1, \lambda_2, \ldots, \lambda_{4Q}$ is input into the unit via the access waveguide 113, the Bragg gratings R($\lambda_1$) will reflect the channel $\lambda_1$, the Bragg gratings R($\lambda_2$) will reflect the channel $\lambda_2$, the Bragg gratings R($\lambda_3$) will reflect the channel $\lambda_3$, etc.

Thus, the phase control elements PCE1 in the waveguides 117, 119 will control the phase of the channel $\lambda_1$ in the multiplex 130, the phase control elements PCE2 in the waveguides 117, 119 will control the phase of the channel $\lambda_2$ in the multiplex 130, the phase control elements PCE3 in the waveguides 117, 119 will control the phase of the channel $\lambda_3$ in the multiplex 130, etc.

Through this arrangement it is thus possible to control the phase of the multiplex 130 on a channel-individual basis. Further, it is possible to control the phases in respective arms 117, 119, such that channels are output in the access waveguide 115 as output 131 or back into the access waveguide 113 as output 132.

For further description of MMIMI-based phase control units having parallel processing of this kind reference is made to the above-mentioned publication: *Theoretical Investigation of a wavelength Selective Switch Architecture Based on a Bragg-Grating-Assisted MMIMI Configuration*, IEEE Photonics Techn. Lett.; Vol. 11, No. 7, July 1999, pages 839–841. This document is hereby incorporated by reference.

Figure 5:
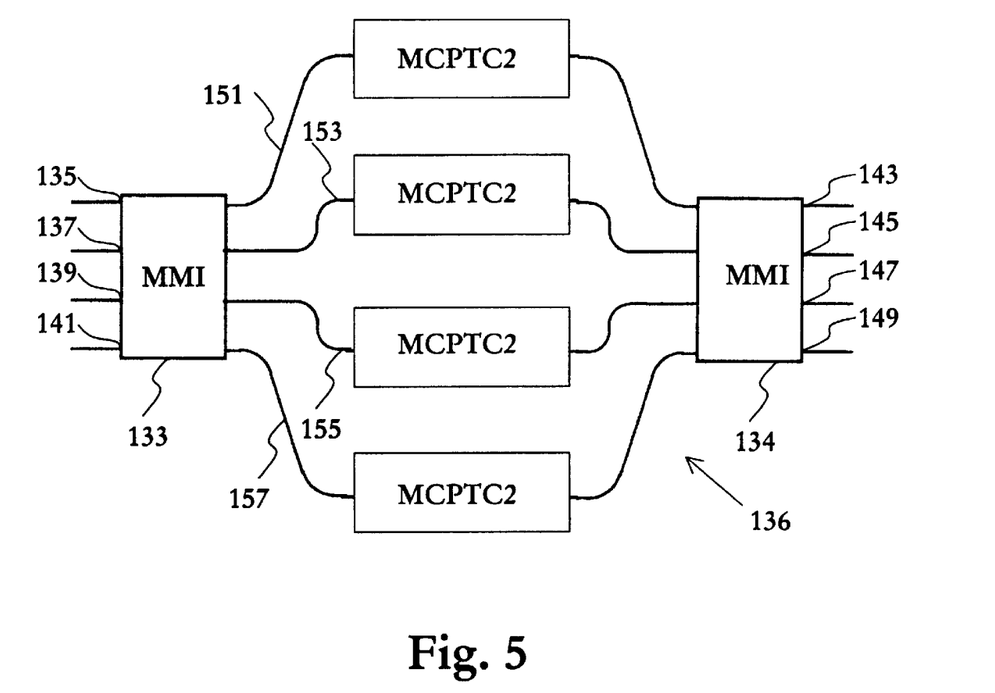
FIG. 5 illustrates schematically a switch according to a third embodiment of the present invention, wherein said switch comprises a plurality of the multichannel wavelength selective phase control unit of FIG. 2.

With reference next to FIG. 5, a 4×4 switch according to a third embodiment of the present invention will be depicted. The switch comprises two MMI waveguides 133, 134 interconnected by means of a Mach-Zehnder waveguide structure 136. The MMI waveguide 133 has four input ports 135, 137, 139, 141 for inputting of up to 4Q wavelengths channels $\lambda_1, \lambda_2, \ldots, \lambda_{4Q}$. The MMI waveguide 134 has four output ports 143, 145, 147, 149 for outputting of separated signals.

The Mach-Zehnder waveguide structure 136 comprises four arms 151, 153, 155, 157, which are each arranged to transmit a respective portion of the intensity of channels input into the switch.

Each of the four arms 151, 153, 155, 157 is provided with a respective multichannel wavelength selective phase control unit MCPTC2, as shown in FIG. 4, where each unit comprises 4Q Bragg gratings for handling of 4Q channels or channel groups.

Through active control of the phase control elements in the 4×4 switch shown in FIG. 5 completely individual switching possibilities for the incoming 4Q channels are thus obtained and each of the channels can be output at any output port 143, 145, 147, 149 (or input port 135, 137, 139, 141). Each channel is controlled individually by means of eight phase control elements in the switch.

It shall be appreciated that the switch is entirely scalable both as regards the number of inputs and outputs as well as regards the number of manageable channels.

It shall also be appreciated that by using Bragg gratings having broader reflection bands and/or closer channel distances some channels may be managed together as a channel group, e.g. for switching in trunk lines.

Figure 6:
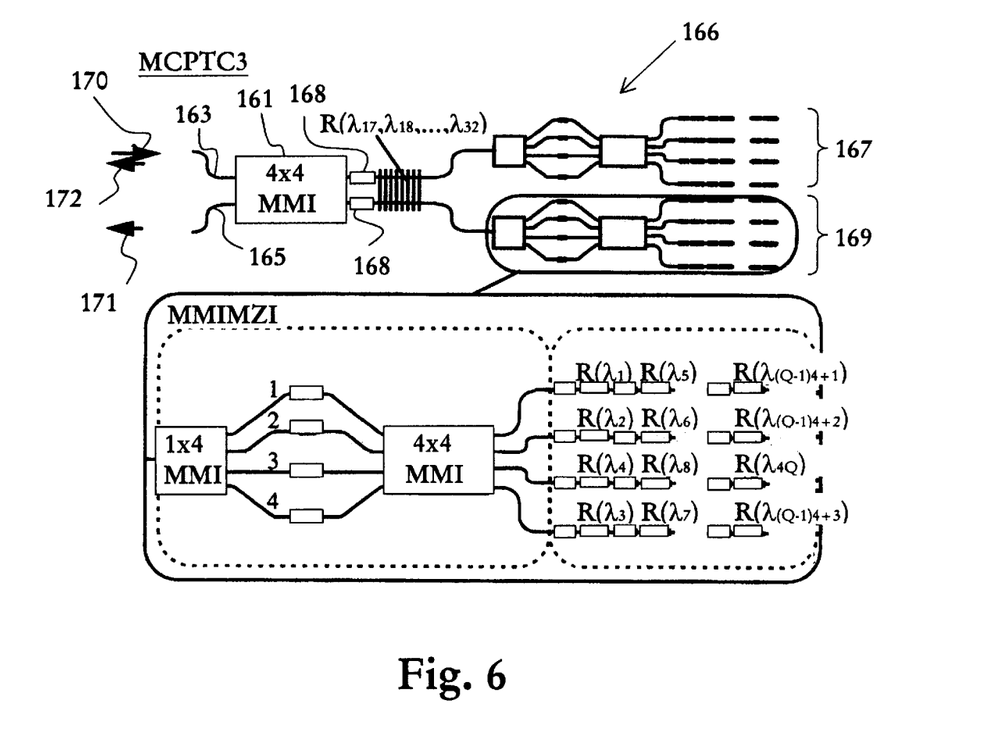
FIG. 6 illustrates schematically a further multichannel wavelength selective phase control unit for use in a wavelength selective switch in accordance with the present invention, wherein one of the MI arms of the unit is shown enlarged in inset.

With reference next to FIG. 6, a 32 channel wavelength selective phase control unit MCPTC3 for use in a wavelength selective switch in accordance with the present invention comprises an MMI waveguide 161 of size 2×2, two access waveguides 163, 165 and an MI waveguide structure 166.

Access waveguides 163, 165 are connected to the MMI waveguide 161 via two ports located on a first side of the MMI waveguide and the MI waveguide structure 166, which comprises two MI arms 167, 169, is connected to the MMI waveguide 161 via two ports located on an opposite side of the MMI waveguide. The MI arms 167, 169 are identical to the MI arms 117, 119 in FIG. 4 in the special case Q=4 except that each of them, between the respective (de) multiplexing unit and MMI waveguide 161, comprises a Bragg grating R($\lambda_{17}, \lambda_{18}, \ldots, \lambda_{32}$) arranged to reflect 16 channels $\lambda_{17}, \lambda_{18}, \ldots, \lambda_{32}$ and a controllable phase control element 168.

If an optical channel multiplex 170 comprising channels $\lambda_1, \lambda_2, \ldots, \lambda_{32}$ is input into the unit via the access waveguide 163, the Bragg gratings R($\lambda_1$) will reflect the channel $\lambda_1$, the Bragg gratings R($\lambda_2$) will reflect the channel $\lambda_2$, the Bragg gratings R($\lambda_3$) will reflect the channel $\lambda_3$, etc. for the channels $\lambda_1$-$\lambda_{16}$. The channels $\lambda_{17}$-$\lambda_{32}$ will all be reflected by the Bragg gratings R($\lambda_{17}, \lambda_{18}, \ldots, \lambda_{32}$)

Thus, the phase control elements PCE1 in the waveguides 167, 169 will control the phase of the channel $\lambda_1$ in the multiplex 170, the phase control elements PCE2 in the waveguides 167, 169 will control the phase of the channel $\lambda_2$ in the multiplex 170, the phase control elements PCE3 in the waveguides 167, 169 will control the phase of the channel $\lambda_3$ in the multiplex 170, etc. for the channels $\lambda_1$-$\lambda_{16}$. The channels $\lambda_{17}$-$\lambda_{32}$ will all be phase-controlled by means of phase control elements 168.

Through this arrangement it is thus possible to control channel-individually the phase of the channels $\lambda_1$-$\lambda_{16}$ in the multiplex 170. The channels $\lambda_{17}$-$\lambda_{32}$ cannot be phase-controlled individually. Further, it is possible to control the phases in respective arms 167, 169, such that the channels are output in the access waveguides 165 as output 171 or back into the access waveguide 163 as output 172.

Figure 7:
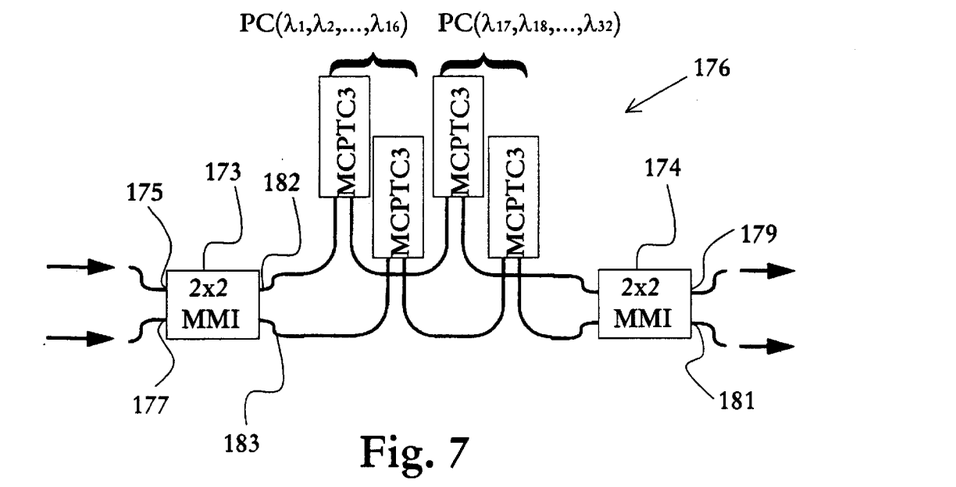
FIG. 7 illustrates schematically a switch according to a fourth embodiment of the present invention, wherein said switch comprises a plurality of the multichannel wavelength selective phase control unit of FIG. 6.

With reference now to FIG. 7, a 2×2 switch according to a fourth embodiment of the present invention will be described. The switch comprises two MMI waveguides 173, 174 interconnected by means of a Mach-Zehnder waveguide structure 176. The MMI waveguide 173 has two input ports 175, 177 for inputting of up to 32 wavelength channels $\lambda_1, \lambda_2, \ldots, \lambda_{32}$. The MMI waveguide 174 has two output ports 179, 181 for outputting of separated signals. The Mach-Zehnder waveguide structure 176 comprises two arms 182, 183, which each is arranged to transmit a respective portion of the intensity of input channels in the switch. Each of the arms 182, 183 is provided with two respective multichannel wavelength selective phase control units MCPTC3 of the type shown in FIG. 6 arranged in series.

The first multichannel wavelength selective phase control unit MCPTC3 in each arm, together denoted PC($\lambda_1, \lambda_2, \ldots, \lambda_{16}$), is arranged for individual phase control of the channels $\lambda_1$-$\lambda_{16}$, while the second multichannel wavelength selective phase control unit MCPTC3 in each arm, together denoted PC($\lambda_{17}, \lambda_{18}, \ldots, \lambda_{32}$), is arranged for individual phase control of the channels $\lambda_{17}$-$\lambda_{32}$. Thus, PC($\lambda_1, \lambda_2, \ldots, \lambda_{16}$)

is identical with the unit shown in FIG. 6, while PC($\lambda_{17}$, $\lambda_{18}$, ..., $\lambda_{32}$) is arranged such that the channels $\lambda_1$-$\lambda_{16}$ are reflected by a Bragg grating and the channels $\lambda_{17}$-$\lambda_{32}$ are reflected in respective arms 167, 169.

Through active control of the phase control elements in the 2×2 switch shown in FIG. 7 completely individual switching capacities for the incoming channels $\lambda_1$-$\lambda_{32}$ are thus obtained and each of the channels can be output at any output port 179, 181. Each of the channels $\lambda_1$-$\lambda_{32}$ is controlled individually by means of four phase control elements in the switch. If the two units PC($\lambda_7$, $\lambda_{18}$, ..., $\lambda_{32}$) are omitted, completely individual switching possibilities for the input channels $\lambda_1$-$\lambda_{16}$ are obtained, while the channels $\lambda_{17}$-$\lambda_{32}$ are switched together as a multiplex through the switch under control of only two phase control elements per MZI arm.

Figure 8:
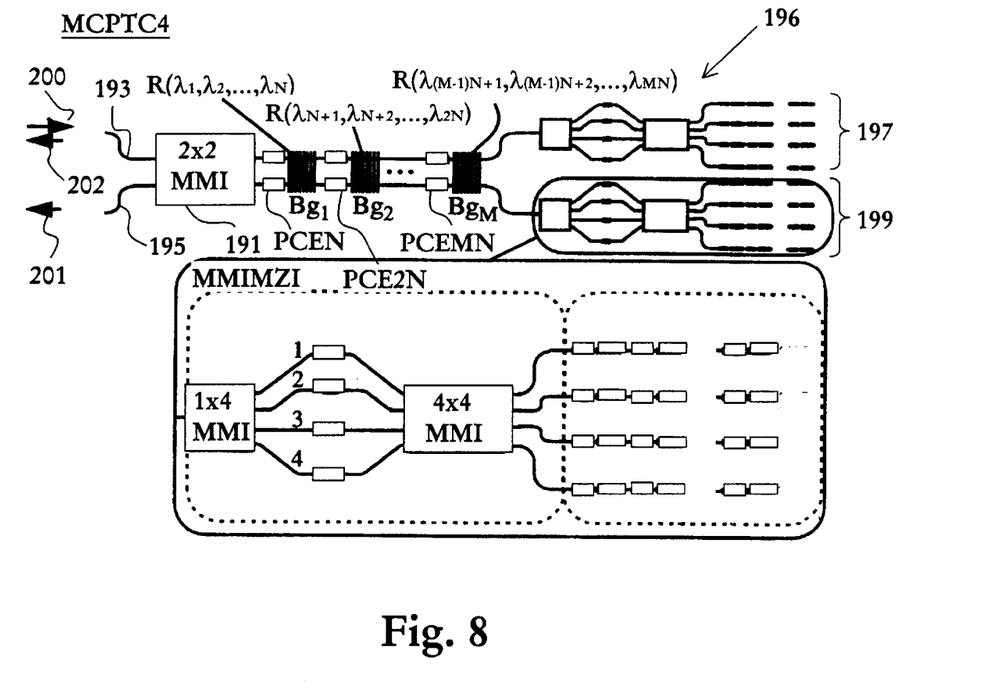
FIG. 8 illustrates schematically a further multichannel wavelength selective phase control unit for use in a wavelength selective switch in accordance with the present invention.

With reference next to FIG. 8, a multichannel wavelength selective phase control unit MCPTC4 for use in a wavelength selective switch in accordance with the present invention comprises an MMI waveguide 191 of size 2×2, two access waveguides 193, 195 and an MI waveguide structure 196.

Access waveguides 193, 195 are connected to the MMI waveguide 191 via two ports located on a first side of the MMI waveguide and the MI waveguide structure 196, which comprises two MI arms 197, 199, is connected to the MMI waveguide 191 via two ports located on an opposite side of the MMI waveguide. The MI arms 197, 199 are identical to the MI arms 117, 119 in FIG. 4 for handling of channels MN+1, MN+2, ..., MN+4Q (M, N and Q are positive integers) except that each of them, between the respective (de)multiplexing unit and MMI waveguide 161, comprises M Bragg gratings R($\lambda_1$, $\lambda_2$, ..., $\lambda_N$); R($\lambda_{N+1}$, $\lambda_{N+2}$, ..., $\lambda_{2N}$); ...; R($\lambda_{(M-1)N+1}$, $\lambda_{(M-1)N+2}$, ..., $\lambda_{MN}$) arranged to reflect respective channel groups $\lambda_1$, $\lambda_2$, ..., $\lambda_N$; $\lambda_{N+1}$, $\lambda_{N+2}$, ..., $\lambda_{2N}$; ...; $\lambda_{(M-1)N+1}$, $\lambda_{(M-1)N+2}$, ..., $\lambda_{MN}$ and M controllable phase control elements PCEN, PCE2N, ..., PCEMN.

If an optical channel multiplex 200 comprising the channels $\lambda_1$, $\lambda_2$, ..., $\lambda_{MN}$, $\lambda_{MN+1}$, $\lambda_{MN+2}$, ..., $\lambda_{MN+4Q}$ is input to the unit via the access waveguide 193, the Bragg gratings R($\lambda_1$, $\lambda_2$, ..., $\lambda_N$); R($\lambda_{N+1}$, $\lambda_{N+2}$, ..., $\lambda_{2N}$); ...; R($\lambda_{(M-1)N+1}$, $\lambda_{(M-1)N+2}$, ..., $\lambda_{MN}$) will reflect the respective channel groups $\lambda_1$, $\lambda_2$, ..., $\lambda_N$; $\lambda_{N+1}$, $\lambda_{N+2}$, ..., $\lambda_{2N}$; ... $\lambda_{(M-1)N+1}$, $\lambda_{(M-1)N+2}$, ..., $\lambda_{MN}$ and the Bragg gratings R($\lambda_{MN+1}$) will reflect the channel $\lambda_{MN+1}$, the Bragg gratings R($\lambda_{MN+2}$) will reflect the channel $\lambda_{MN+2}$, the Bragg gratings R($\lambda_{MN+3}$) will reflect the channel $\lambda_{MN+3}$ etc. for the channels $\lambda_{MN+1}$-$\lambda_{MN+4Q}$.

The phase control element PCEN in the waveguides 197, 199 will thus control the phase of the channels $\lambda_1$-$\lambda_N$ in the multiplex 200, the phase control element PCE2N in the waveguides 197, 199 will control the phase of the channels $\lambda_{N+1}$-$\lambda_{2N}$ etc. for the M channel groups. Further, the phase control elements PCEMN+1 in the waveguides 197, 199 will control the phase of the channel $\lambda_{MN+1}$ in the multiplex 200, the phase control elements PCEMN+2 in the waveguides 197, 199 will control the phase of the channel $\lambda_{MN+2}$ in the multiplex 200, the phase control elements PCEMN+3 in the waveguides 197, 199 will control the phase of the channel $\lambda_{MN+3}$ in the multiplex, 200 etc. for the channels $\lambda_{MN+1}$-$\lambda_{MN+4Q}$.

Through this arrangement it is thus possible to control channel-individually the phase of the channels $\lambda_{MN+1}$-$\lambda_{MN+4Q}$ in the multiplex 200. The channels $\lambda_1$-$\lambda_{MN}$ cannot be phase-controlled individually but only in groups of N channels. Further, it is possible to control the phases of the respective arms 197, 199, such that the channels will be output in the access waveguide 195 as output 201 or back into the access waveguide 193 as output 202.

Figure 9:
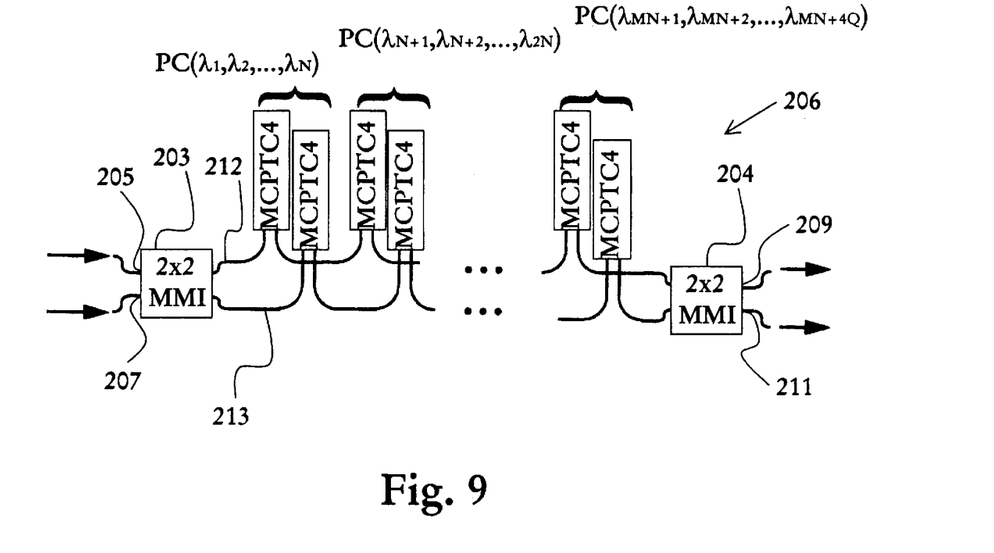
FIG. 9 illustrates schematically a switch according to a fifth embodiment of the present invention, wherein said switch comprises a plurality of the multichannel wavelength selective phase control unit of FIG. 8.

With reference now to FIG. 9, a 2×2 switch according to a fifth embodiment of the present invention will be described. The switch comprises two MMI waveguides 203, 204 connected by means of a Mach-Zehnder waveguide structure 206. The MMI waveguide 203 has two input ports 205, 207 for inputting of up to MN+4Q wavelength channels $\lambda_1$, $\lambda_2$, ..., $\lambda_{MN+4Q}$. The MMI waveguide 204 has two output ports 209, 211 for outputting of separated signals.

The Mach-Zehnder waveguide structure 206 comprises two arms 212, 213, which each is arranged to transmit a respective portion of the intensity of the channels input in the switch. Each of the arms 212, 213 is provided with M+1 respective multichannel wavelength selective phase control units MCPTC4 of the type shown in FIG. 8 arranged in series.

The first multichannel wavelength selective phase control unit MCPTC4 in each arm, together denoted PC($\lambda_1$, $\lambda_2$, ..., $\lambda_N$), is arranged for individual phase control of the channels $\lambda_1$-$\lambda_N$, the second multichannel wavelength selective phase control unit MCPTC4 in each arm, together denoted PC($\lambda_{N+1}$, $\lambda_{N+2}$, ..., $\lambda_{2N}$), is arranged for individual phase control of the channels $\lambda_{N+1}$-$\lambda_{2N}$, etc. up to PC($\lambda_{(M-1)N+1}$, $\lambda_{(M-1)N+2}$, ..., $\lambda_{MN}$), which is arranged for individual phase control of the channels $\lambda_{(M-1)N+1}$-$\lambda_{MN}$. Finally, PC($\lambda_{MN+1}$, $\lambda_{MN+2}$, ..., $\lambda_{MN+4Q}$) is arranged for individual phase control of the channels $\lambda_{MN+1}$-$\lambda_{MN+4Q}$. Each phase control unit is modified, such that the channels, which it phase controls individually, are arranged to be reflected in the arms 197, 199. Thus, it is appreciated that the unit PC($\lambda_{MN+1}$, $\lambda_{MN+2}$, ..., $\lambda_{MN+4Q}$) is identical to the unit shown in FIG. 8, while the rest of the units are phase-tuned to other channels.

Through active control of the phase control elements in the 2×2 switch shown in FIG. 9 completely individual switching possibilities for the incoming channels $\lambda_1$-$\lambda_{MN+4Q}$ are thus obtained and each of the channels may be output at any output port 209, 211. Each of the channels $\lambda_1$-$\lambda_{MN+4Q}$ is controlled individually by means of four phase control elements in the switch.

By omitting one of the pair of phase control units in FIG. 9 the channels, which are individually phase-controlled by this pair, may still be handled together and switched as a channel multiplex.

It shall be appreciated that the switch according to the fourth and fifth embodiments of the invention is entirely scalable both as regards the number of inputs and outputs as well as the number of manageable channels.

It shall also be appreciated that the present invention in general may also be used for add/drop multiplexing and other multiplexing.

The invention is of course not limited to the embodiments described above and shown in the drawings but may be modified within the scope of the appended patent claims. Particularly, the invention is apparently not limited as regards material choice, dimensions or manufacture of the apparatus.

It shall be appreciated that the switch according to the fourth and fifth embodiments in general cannot be switched from one input to another as in the embodiments 1–3.

It shall further be appreciated that the switch is completely reciprocal and thus has an equivalent functionality in the reverse direction.

What is claimed is:

1. An apparatus for wavelength selective switching of a plurality of optical wavelength channels, comprising two MMI waveguides interconnected by at least two Mach Zehnder waveguide structures arranged in parallel, of which each is arranged to transmit a respective portion of the intensity of said plurality of optical wavelength channels, wherein each Mach Zehnder waveguide structure comprises:
   a demultiplexing unit, a multiplexing unit and at least two waveguides arranged in parallel, wherein
      the demultiplexing unit is arranged for demultiplexing of said plurality of optical wavelength channels into at least two channel groups;
      each waveguide is arranged in parallel for transmission of a respective of said channel groups to the multiplexing unit and is further provided with a respective multichannel wavelength selective phase control unit arranged for individual phase control of at least some channels in the respective of said channel groups transmitted to the multiplexing unit; and
      the multiplexing unit is arranged for multiplexing of said channel groups;
   wherein each multichannel wavelength selective control unit is an MMIMI based device, wherein each MI arm at least comprises, as seen from the MMI waveguide, a first phase control element, a first Bragg grating, a second phase control element and a second Bragg grating, the first Bragg grating being arranged for reflection of at least a first channel in the respective of said channel groups, which is handled by the phase control unit, the second Bragg grating being arranged for reflection of at least a second channel in the respective of said channel groups, which is handled by the phase control unit, and the phase control elements being arranged for phase control of the respective channels, which are transmitted through them.

2. The apparatus as claimed in claim 1 wherein the demultiplexing unit is an MMIMZI-based device, wherein each MZI arm comprises a phase control or phase adjustment element.

3. The apparatus as claimed in claim 1 wherein the multiplexing unit is an MMIMZI-based device, wherein each MZI arm comprises a phase control or phase adjustment element.

4. The apparatus as claimed in claim 1 wherein the demultiplexing unit and the multiplexing unit are interconnected by the at least two waveguides arranged in parallel.

5. The apparatus as claimed in claim 1 wherein said two MMI waveguides interconnected by said Mach-Zehnder waveguide structures arranged in parallel are of size 2×2 and the number of Mach-Zehnder waveguide structures arranged in parallel is two.

6. The apparatus as claimed in claim 1 wherein said two MMI waveguides interconnected by said Mach-Zehnder waveguide structures arranged in parallel are at least of size 4×4 and the number of Mach-Zehnder waveguide structures arranged in parallel is at least four.

7. The apparatus as claimed in claim 1 wherein said plurality of optical wavelength channels comprises at least four channels.

8. The apparatus as claimed in claim 1 wherein said plurality of optical wavelength channels comprises at least eight channels.

9. The apparatus as claimed in claim 1 wherein said plurality of optical wavelength channels comprises at least 16 channels.

10. The apparatus as claimed in claim 1 arranged for individual switching of each channel in each channel group.

11. The apparatus as claimed in claim 1 arranged for joint switching of all channels in at least some channel group.

12. An apparatus for wavelength selective switching of a plurality of optical wavelength channels, comprising two MMI waveguides interconnected by at least two Mach Zehnder waveguide structures arranged in parallel, of which each is arranged to transmit a respective portion of the intensity of said plurality of optical wavelength channels, wherein each Mach Zehnder waveguide structure comprises:
   a demultiplexing unit, a multiplexing unit and at least two waveguides arranged in parallel, wherein
      the demultiplexing unit is arranged for demultiplexing of said plurality of optical wavelength channels into at least two channel groups;
      each waveguide is arranged in parallel for transmission of a respective of said channel groups to the multiplexing unit and is further provided with a respective multichannel wavelength selective phase control unit arranged for individual phase control of at least some channels in the respective of said channel groups transmitted to the multiplexing unit; and
      the multiplexing unit is arranged for multiplexing of said channel groups;
   wherein each Mach Zehnder waveguide structure comprises an MMIMI based configuration, wherein each MI arm comprises a respective of said demultiplexing unit and multiplexing unit.

13. The apparatus as claimed in claim 12 wherein said demultiplexing unit and multiplexing unit in the respective MI arm are comprised of an MZI-based demultiplexing/multiplexing unit.

14. The apparatus as claimed in claim 13 wherein each demultiplexing/multiplexing unit is provided with at least two waveguides arranged in parallel, wherein each waveguide is provided with Bragg gratings and phase control elements arranged for individual phase control of at least some channels in the respective of said channel groups, which is transmitted in the waveguide.

15. The apparatus as claimed in claim 14 wherein each multichannel wavelength selective phase control unit at least comprises, as seen from the demultiplexing/multiplexing unit, a first phase control element, a first Bragg grating, a second phase control element and a second Bragg grating, the first Bragg grating being arranged for reflection of at least a first channel in the respective of said channel groups, which is handled by the phase control unit, the second Bragg grating being arranged for reflection of at least a second channel in the respective of said channel groups, which is handled by the phase control unit, and the phase control elements being arranged for phase control of respective channels, which are transmitted through them.

16. The apparatus as claimed in claim 13 wherein each MI arm in the MMIMI based configuration comprises a Bragg grating; located between the MMI waveguides of the MMIMI based arrangement and said MZI based demultiplexing/multiplexing unit, which Bragg grating is arranged for reflection of at least some of said plurality of optical wavelength channels.

17. The apparatus as claimed in claim 16 wherein at least some MI arm in the MMIMI-based configuration comprises a phase control element located between the MMI waveguides of the MMIMI-based configuration and said Bragg grating, which is arranged for reflection of said at least some of said plurality of optical wavelength channels.

18. An apparatus for wavelength selective switching of a plurality of optical wavelength channels, comprising two MMI waveguides interconnected by at least two Mach-Zehnder waveguide structures arranged in parallel, of which each is arranged to transmit a respective portion of the intensity of said plurality of optical wavelength channels, wherein each Mach-Zehnder waveguide structure comprises:

an MMIMZI-based demultiplexing unit and an MMIMZI-based multiplexing unit interconnected by at least two waveguides arranged in parallel, wherein the demultiplexing unit is arranged for demultiplexing of said plurality of optical wavelength channels into at least two channel groups;

each waveguide arranged in parallel is arranged for transmission of a respective of said channel groups to the multiplexing unit and is further provided with a respective multichannel wavelength selective MMIMI-based phase control unit arranged for individual phase control of at least some channels in the respective of said channel groups, which is transmitted to the multiplexing unit; and the multiplexing unit is arranged for multiplexing of said channel groups.

19. An apparatus for wavelength selective switching of a plurality of optical wavelength channels, comprising two MMI waveguides interconnected by at least two Mach-Zehnder waveguide structures arranged in parallel, of which each is arranged to transmit a respective portion of the intensity of said plurality of optical wavelength channels, wherein each Mach-Zehnder waveguide structure comprises:

an MMIMI configuration including:
an MMI waveguide at least of size 2×2; and
at least two MI waveguide structures connected in parallel to said MMI waveguide, wherein each MI waveguide structure is arranged to transmit a respective portion of the intensity of said plurality of optical wavelength channels and wherein each MI waveguide structure connected in parallel comprises a respective MMIMZI-based demultiplexing/multiplexing unit and at least two MI waveguides arranged in parallel, where the demultiplexing/multiplexing unit is arranged for demultiplexing of said plurality of optical wavelength channels into at least two channel groups, outputting of respective of said channel groups in respective waveguides, reception of respective of said channel groups reflected in respective waveguide, and multiplexing of said channel groups; and each waveguide arranged in parallel is provided with Bragg gratings and phase control elements arranged for individual phase control of at least some channels in the respective of said channel groups, which is reflected to the demultiplexing/multiplexing unit.

20. A method for wavelength selective switching of a plurality of optical wavelength channels in an apparatus, comprising two MMI waveguides interconnected by at least two Mach Zehnder waveguide structures arranged in parallel, of which each is arranged to transmit a respective portion of the intensity of said plurality of optical wavelength channels, comprising performing the following steps in each Mach Zehnder waveguide structure:

demultiplexing said plurality of optical wavelength channels into at least two channel groups by means of a demultiplexing unit;

transmitting respective channel group to a multiplexing unit by means of a respective waveguide arranged in parallel;

phase controlling individually at least some channels in a respective channel group, which is transmitted to the multiplexing unit, by means of a respective wavelength selective phase control unit arranged at a respective waveguide arranged in parallel, wherein each respective wavelength selective control unit is an MMIMI based device, wherein each MI arm at least comprises, as seen from the MMI waveguide, a first phase control element, a first Bragg grating, a second phase control element and a second Bragg grating, the first Bragg grating being arranged for reflection of at least a first channel in the respective of said channel groups, which is handled by the phase control unit, the second Bragg grating being arranged for reflection of at least a second channel in the respective of said channel groups, which is handled by the phase control unit, and the phase control elements being arranged for phase control of the respective channels, which are transmitted through them; and multiplexing said channel groups by means of the multiplexing unit.

* * * * *